March 16, 1965
L. A. ARCHER
3,173,296
AIR MEASURING DEVICE
Filed Jan. 25, 1962
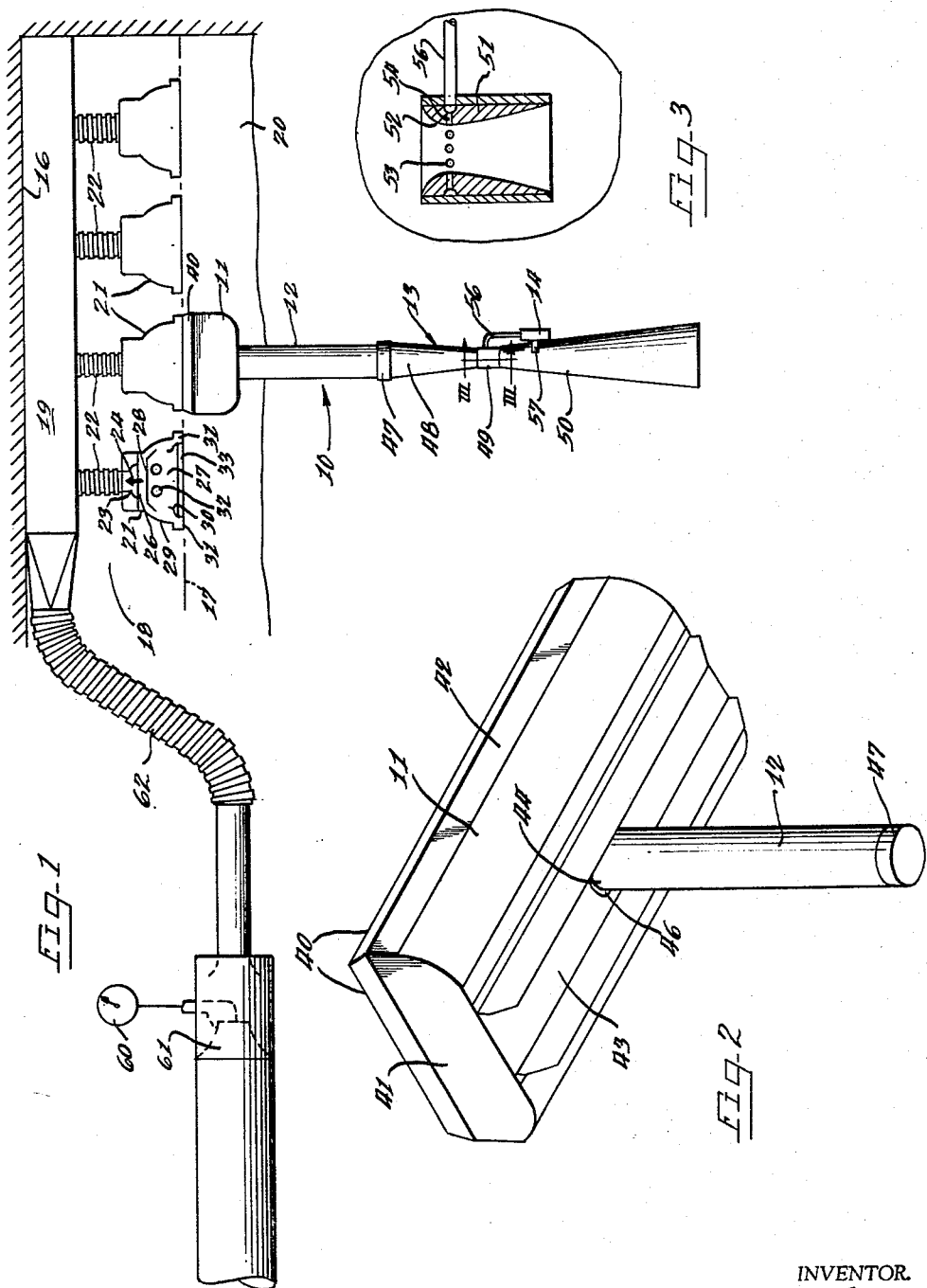
INVENTOR.
Lee A. Archer
BY
Hill, Sherman, Meroni, Gross & Simpson
ATTORNEYS

United States Patent Office 3,173,296
Patented Mar. 16, 1965

3,173,296
AIR MEASURING DEVICE
Lee A. Archer, Wheaton, Ill., assignor to The Pyle-National Company, Chicago, Ill., a corporation of New Jersey
Filed Jan. 25, 1962, Ser. No. 168,773
1 Claim. (Cl. 73—213)

This invention relates generally to air measuring devices and more particularly relates to a field tester for measuring the air flow discharged from an air-troffer, or combination lighting unit and ventilating unit.

The combination of lighting and air distribution has been accomplished by utilizing a so-called troffer-type lighting fixture utilized to obtain the advantage of fluorescent lighting and combining therewith a ventilating system wherein the troffer functions as either an air distribution troffer or an air return troffer.

In the usual application of such combined constructions, the ceiling of an architectural space is characterized by a plurality of recessed troffers, thereby providing the needed quality of lighting and air distribution while presenting a clean, uncluttered appearance to the ceiling.

In one form of combined construction or air-troffer, cold or heated air is fed from a duct through a flexible tubing to the troffer fixture. The air enters through a valve assembly into an air distribution chamber and then flows in a uniform path through louvered vanes running the entire length of both sides of the troffer. Air flow is controlled by the valve assembly attached to the troffer and by vanes, scoops and baffles inside of the troffer. The air flow is discharged between the shielding frame of the troffer fixture and the troffer housing.

It will be apparent that the troffer fixtures are thus connected to a source of ventilating air at increased pressure which usually consists of a primary supply duct extending in the space concealed behind the false ceiling of the architectural space. A severe problem of "balancing" the system is thus presented because the troffer fixtures closer to the source of supply tend to discharge more air than the troffer fixtures more remote from the source of supply.

In order to balance the system by adjusting the individual valves in the respective air-troffers, it is necessary to obtain an accurate measure of the air discharged from each respective troffer.

A survey and subsequent averaging of the velocities using a velocity probe at the outlet of each individual troffer would be time-consuming, and subject to operator error. However, the quantity of air issuing from the outlet being measured would not be changed by the measuring probe.

A collector cone with some measuring device, such as an anemometer or a velocity probe, could be used over one-half of a given outlet without appreciably changing the quantity of air issuing from that outlet. However, with some units, such as the louvered one, the air would shunt to the uncovered half instead of going through the measuring device.

If a collector were used over the entire outlet, an appreciable unpredictable quantity of air would shunt to the other outlets in the same branch.

In accordance with the methods and apparatus of the present invention, the air discharged from an air-troffer is collected by a special collecting hood, whereupon all of the collected air is directed in the form of a confined stream through a booster venturi. The booster venturi has the effect of temporarily increasing the velocity head of the stream while commensurately decreasing the pressure head. The venturi has small friction loss and is an efficient measuring device. The control of the entrance permits a single reading at the throat center line which is proportional to the quantity of air flowing. Further, the booster action of the venturi makes it possible to obtain good registration on commercially available velometers of the stationary vane type.

The device of the present invention has a regain section matched to the friction loss of the instrument thereby making the measuring device independent of the diffuser design being measured and insuring maximum accuracy and convenience.

It is an object of the present invention, therefore, to provide an improved air measuring device having the characteristics and advantages herein described.

Many other advantages and additional features of the present invention will become manifest to those versed in the art upon making reference to the detailed description which follows and the accompanying sheet of drawings in which a preferred structural embodiment of the apparatus of the present invention suitable for practicing the methods contemplated herein is shown by way of illustrative example.

On the drawings:

FIGURE 1 is a somewhat schematic view showing an air measuring device in accordance with the principles of the present invention associated with a four troffer mock-up which can be used in calibrating the testing device;

FIGURE 2 is a perspective view illustrating the collecting hood and the straightener pipe of the air testing device of the present invention; and FIGURE 3 is an enlarged cross-sectional view taken on line III—III of FIGURE 1.

As shown on the drawings:

The air testing device of the present invention is shown generally at 10 and comprises generally in series connection a collector hood 11, a straightener pipe 12, a booster venturi shown generally at 13 and a velometer 14. The air measuring device 10 is particularly adapted for use with a ventilating system of the type utilizing recessed air troffers in the ceiling of an architectural structure. Thus, a typical installation has the characteristics manifested by the mock-up illustrated in FIGURE 1 wherein the ceiling of an architectural structure is shown generally at 16 and a false ceiling is shown at 17 spaced from the ceiling 16, thereby to form a space 18 into which is extended a primary air supply duct 19 connected to a suitable source of ventilating air which can be temperature conditioned either by heating or cooling for supplying temperature-conditioned ventilating air to the space 20 which is being illuminated and ventilated by a plurality of recessed air troffers herein shown generally at 21. Each air distribution troffer 21 is connected by a suitable flexible tube 22 to the air duct 19. One of the troffers 21 is shown in cross-section and includes a collar 23 to which the flexible tube 22 is connected and in which is contained an adjustable valve asesmbly 24, thereby to control the admission of ventilating air at increased pressure into a distribution chamber 26. The distribution chamber 26 is separated from a lighting trough 27 by a partition means 28 forming together with the side walls of the troffer housing 29 air flow passages which together with vanes and scoops, shown at 30, direct the air out of outlets 31 into the space being ventilated without appreciably moving the air within the lighting trough 27. Fluorescent lighting tubes 32 are situated within the lighting trough 27, thereby to emit rays of light which are projected through shielding such as that shown at 33 and which may comprise a glass plate, or in other instances, a waffle-type grille.

In accordance with the principles of the present invention, the collecting hood 11 is used which is particularly characterized by a generally rectangular peripherally extending lip 40 which snugly and closely embraces the contact surfaces adjacent each respective troffer unit 21 to collect all of the air discharged from a single troffer unit. If desired, the lip 40 may be made of a resilient or elastic material. The collector hood 11 is further characterized by end walls 41, side walls 42 and a bottom wall 43, particularly characterized by a centrally disposed opening 44. The walls 41, 42 and 43, together with one another, form a collecting chamber and the opening 44 provides a passage through which the collected air is discharged in the form of a confined stream.

In order to straighten the air flow, the straightener pipe 12 is connected as at 46 to the opening 44 and thus the collected stream flows as a straight air stream towards the booster venturi shown generally at 13.

At its opposite end, the straightener pipe 12 has a collar 47 to which the booster venturi 13 is connected. The booster venturi 13 has a convergent section forming an entrance cone 48, a venturi throat 49 and a divergent section forming an expansion cone 50.

As is shown in the enlarged inset of FIGURE 3, the venturi throat 49 includes a specific throat member 51 shaped to provide a venturi restriction 52. A plurality of openings 53 at the narrowest constriction of the throat or throat center line 52 communicate with an annular channel 54 and a tube 56 is connected to the channel 54 and extends outwardly of the throat 49.

A velometer as shown at 14 is connected to the tube 56 and also has portions as shown at 57 connected to the divergent portion 50 of the booster venturi 13.

Since a venturi is one of the most efficient measuring devices available in that it has a very small friction loss, the proper regulation of the entrance through the straightener 12 and entrance cone 48 makes it possible to take one reading at the throat centerline which is proportional to the quantity flowing. Moreover the reading is sufficiently high to register on commercially available velometers of the stationary vane-type as shown at 14.

It will be noted upon inspecting FIGURE 1 that the expansion cone 50 of the venturi 13 is a definite amount longer than the entrance cone 48. The increased length makes it possible to use the kinetic energy of the air to overcome the friction of the device. When this is done, the shunting of air from the diffuser being measured to other diffusers on the branch is eliminated. If the cone 50 is too short, air issuing from the measured outlet is restricted, and if the cone 50 is too long, air issuing from the measured outlet is assisted as long as there is sufficient air to fill the divergent cone. Accordingly, the regain section or expansion cone 50 is, in effect, matched to the friction loss of the device, thereby making the device independent of the diffuser design while insuring maximum accuracy and convenience.

With the particular mock-up arrangement of FIGURE 1, a pressure gauge is shown at 60 and is located at a nozzle measuring station 61 whereby the pressure to the duct 19 may be maintained constant. The air supply is furnished to the duct 19 via a flexible tube shown at 62.

With the set up of four troffers completely assembled as shown in FIGURE 1, the air measuring device 10 is used to record readings from the velometer 14 on each of the four troffers and the readings are averaged. That average reading in degees of deflection is then plotted against one-quarter of the actual flow taken from the air measuring station and figures are obtained for plotting an appropriate calibration graph.

It has been determined the air measuring device 10 is an effective instrument which is particularly capable of facilitating the exact balance of a multiple outlet system, particularly where the outlets consist of air troffer units recessed in the ceiling of an architectural space.

Although minor modifications might be suggested by those versed in the art, it should be understood that I wish to embody within the scope of the patent warranted hereon all such modifications as reasonably and properly come within the scope of my contribution to the art.

I claim as my invention:

A field tester for air-troffer units comprising,
  a trough-shaped collector having
    a continuous peripheral abutment lip for engaging the outlet of an air-troffer to collect all of the air discharged thereby,
    said collector having a wall formed with an opening therein through which the collected air is discharged,
  an air straightener conduit connected to said opening straightening the air flow out of said opening,
  a booster venturi having an entrance cone connected with said air straightener,
    said venturi having convergent and divergent portions and a throat therebetween through which the air passes,
    and an expansion cone sufficiently longer than the entrance cone to form a regain section overcoming the friction loss of the field tester,
  and a velometer responsive to air velocity at the venturi throat center line,
    said velometer yielding readings proportional to the air flow discharge.

References Cited by the Examiner

UNITED STATES PATENTS

| | | | |
|---|---|---|---|
| 1,311,798 | 7/19 | Bristol | 73—213 |
| 1,588,715 | 6/26 | Favata | 73—198 X |
| 2,205,761 | 6/40 | Hallberg | 73—198 X |
| 2,336,209 | 12/43 | Anderson | 73—230 X |
| 2,704,555 | 3/55 | Dall | 73—213 X |
| 2,872,810 | 2/59 | Shaffer | 73—213 |
| 3,013,432 | 12/61 | O'Keeffe | 73—213 |

RICHARD C. QUEISSER, *Primary Examiner.*

ROBERT L. EVANS, *Examiner.*